July 30, 1963  O. DANN  3,099,660
SYNTHESIS OF KHELLIN AND INTERMEDIATES THEREFOR
Filed Feb. 14, 1961
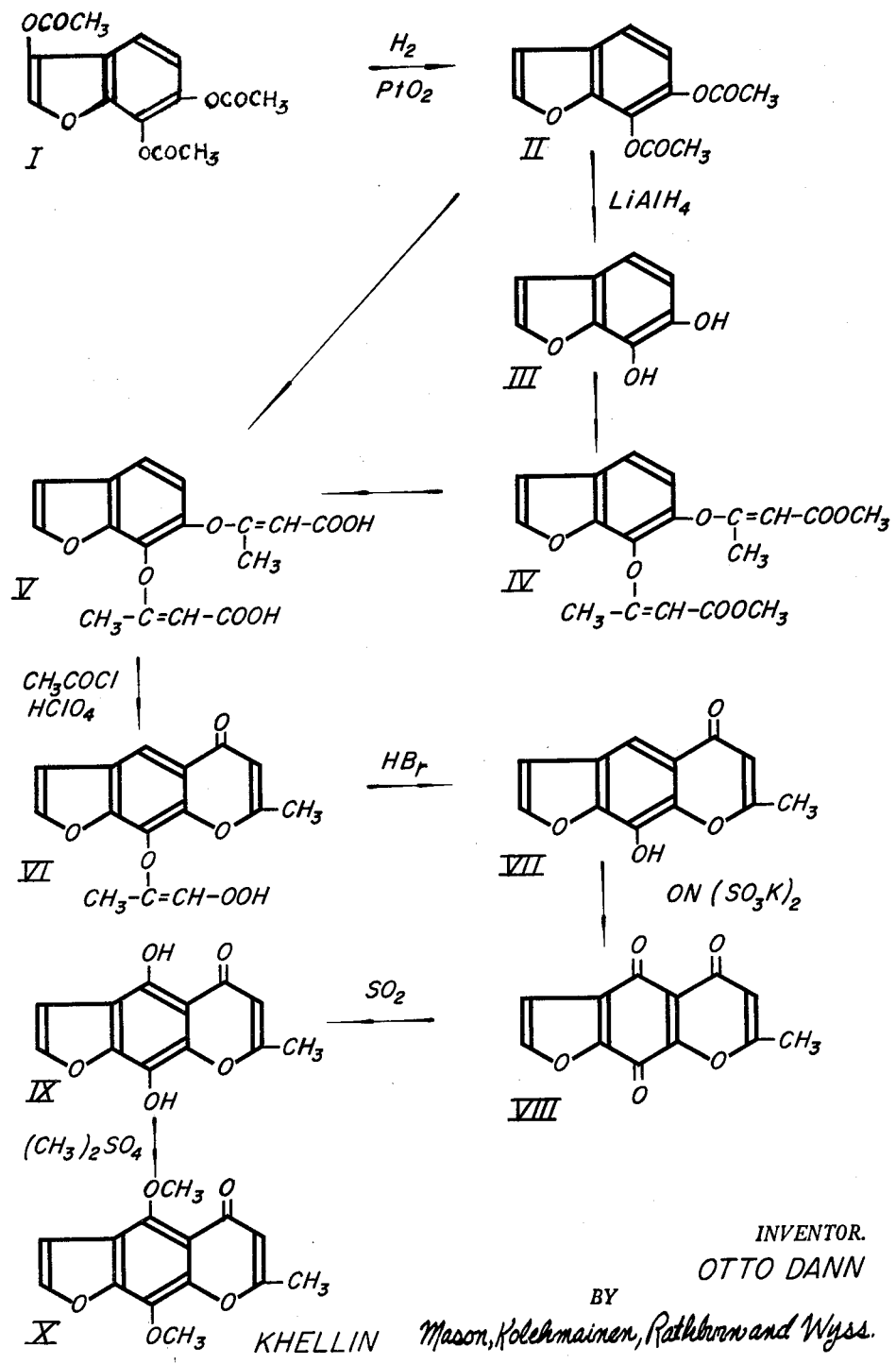
INVENTOR.
OTTO DANN
BY
Mason, Kolehmainen, Rathburn and Wyss.
ATTORNEYS

United States Patent Office 3,099,660
Patented July 30, 1963

3,099,660
SYNTHESIS OF KHELLIN AND INTERMEDIATES THEREFOR
Otto Dann, Meilwaldstrasse 11, Rudelsveiher, Erlangen, Germany
Filed Feb. 14, 1961, Ser. No. 89,220
17 Claims. (Cl. 260—345.2)

This invention relates to a method of synthesizing khellin and to homologs. More particularly this invention relates to improved procedures in producing intermediates useful in the production of khellin and its homologs.

Khellin is a natural product which has been isolated from the seeds of certain plants. It is a valuable medicinal agent used in the treatment of asthma and angina pectoris. Because of its commercial importance, improved methods of synthesizing this material as well as intermediates in its synthesis are of substantial industrial importance.

I have discovered a procedure for synthesizing khellin from readily available chemicals in high yield and of high quality. In particular I have discovered improved methods for producing intermediates which are useful in the manufacture of khellin. It is the object of this invention to provide improvements in the synthesis of khellin and to provide valuable intermediates therefor.

My invention is more readily understood by reference to the attached drawing which outlines in diagrammatic form the steps and intermediate compounds in the synthesis of khellin (X) from 3,6,7-triacetoxybenzofuran (I), a known compound. 3,6,7-triacetoxybenzofuran is converted by hydrogenation in the presence of platinum oxide catalyst to 6,7-diacetoxybenzofuran (II). The latter is converted by reaction with lithium aluminum hydride in ether to 6,7-dihydroxybenzofuran (III). The latter compound is reacted with methyl β-chlorocrotonate in the presence of solid alkali to form the ether-ester (IV) which is then hydrolyzed to the ether-acid (V). An alternative procedure is to react 6,7-diacetoxybenzofuran (II) directly with methyl β-chlorocrotonate in the presence of alkali to form the ether-acid (V). Treatment of V with acetyl chloride and a trace of perchloric acid causes formation of a pyran ring and the production of 2-methyl - 8 - (1"-carboxy-1"-propen-2"-yloxy)furo[2', 3',7,6]chromone (VI). The latter is hydrolyzed to the corresponding 8-hydroxy compound (VII) by treatment with hydrobromic acid. Oxidation of VII with potassium nitrosodisulfonate (or with nitric acid in ethanol or chromium trioxide in acetic acid) leads to khellin quinone (VIII) which can be reduced with sulfur dioxide to 5,8-bisnorkhellin (IX) which can be methylated to khellin (X).

One of the features of this invention is an improved method of forming 8-hydroxyfurochromone compounds, such as compound VII shown in the drawing. In this improved procedure a benzofuran compound containing hydroxyl groups in the 6,7-positions is reacted with an alkyl ester of a β-halo-α,β-unsaturated aliphatic acid in the presence of alkali, such as potassium carbonate, in an inert atmosphere at 50–125° C. The hydroxyl groups of the benzofuran compound react with the halogen of the alkyl ester of the β-halo-α,β-unsaturated aliphatic acid to form an ether linkage at the 6- and 7-positions of the benzofuran compound, accompanied by the elimination of the elements of hydrogen halide which are neutralized by the alkali present. The synthesis is illustrated in the drawing by the conversion of III to the ether-ester IV. While the drawing shows the reaction with the methyl ester of a β-halocrotonic acid, the reaction is operative with other halongenated α,β-unsaturated esters such as ethyl β-bromoacrylate and methyl β-chloro-β-ethylacrylate. The resulting ether-ester (IV) produced by the reaction described above is saponified to produce the corresponding ether-acid (V). Ring closure of the ether-acid V produces a pyran ring by reaction with an alkanoic acid halide, such as acetyl chloride in the presence of a trace of acid. The pyran ring formation is illustrated in the drawing by the conversion of V to VI.

An alternative procedure in the production of 6,7-di(1'-carboxy - 1' - propen - 2' - yloxy)benzofuran compounds is that of reacting an ester of a 6,7-dihydroxybenzofuran, such as 6,7-dihydroxybenzofuran diacetate with an excess of an alkyl ester of a β-halo-α,β-unsaturated aliphatic acid in an anhydrous solvent having a boiling point in the range of 50–125° C. in the presence of an excess of solid alkali, such as potassium carbonate. The reaction is preferably carried out in an inert atmosphere, such as a nitrogen atmosphere. During this procedure the 6,7-dihydroxybenzofuran ester is hydrolyzed and converted into an ether with the halogenated ester. During the same procedure the resulting ether-ester is hydrolyzed to form the free acid. This series of reactions are illustrated in the drawing by the direct conversion of II to V by reaction with methyl β-chlorocrotonate. The reaction is operative with other esters of β-halo-α,β-unsaturated aliphatic acids, such as ethyl β-bromocrotonate and methyl β-chloroacrylate. This procedure gives excellent yields and avoids the isolation of the corresponding 6,7-dihydroxybenzofuran compound which is susceptible to oxidation, the deacylation and etherification reaction occurring in one step.

Another feature of this invention is the discovery of a novel method of producing khellin quinone (VIII) and related compounds by oxidation of an 8-hydroxyfuro[2', 3', 7, 6]chromone compound with an oxidizing agent, such as potassium nitrosodisulfate, which has the formula $ON(SO_3K)_2$, in dimethylformamide, or with nitric acid or chromic anhydride ($CrO_3$) in suitable solvents, such as ethanol, acetic acid or pyridine. In the oxidation procedure the benzene ring of the furanochromone is converted to a quinone and the latter can be reduced to the corresponding hydroquinone compound which can then be methylated to produce khellin or khellin derivatives. The oxidation reaction can be illustrated by the following general equation:

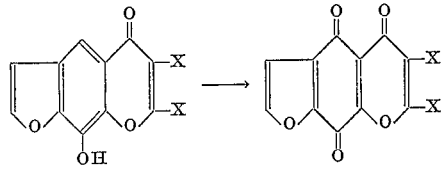

wherein X represents hydrogen or alkyl radicals.

A further novel feature of this invention is a method of preparing 6,7-dihydroxybenzofuran from the corresponding 6,7-diacyloxybenzofuran. In the past this procedure has been carried out by saponification of the acyl radicals with alkali but the product (6,7-dihydroxybenzofuran) has a great tendency to oxidize in alkaline solution which seriously detracts from this procedure. I have discovered that the deacylation reaction can be conducted with alkali metal hydride of a metal of group IIIA of the periodic table, such as lithium aluminum hydride or sodium borohydride, in an inert solvent, such as diethyl ether or other aliphatic ethers. The procedure is preferably carried out at the boiling point of the solvent, between about 30° and 100° C., in an inert atmosphere, such as nitrogen atmosphere.

The invention is disclosed in further detail by means of the following examples which are provided for the purposes of illustration only and are not intended to limit the scope of the invention. It will be appreciated by those skilled in the art that numerous modifications in operating conditions, such as temperatures, solvents, concentrations of reagents and the like may be made without departing from the invention. In these examples amounts of materials are given in grams and milliliters (ml.) and temperatures are recorded in degrees centigrade (° C.).

*Example 1*

6,7-diacetoxybenzofuran (II) was prepared by hydrogenating 10 grams of 3,6,7-triacetoxybenzofuran (I) in 80 ml. of ethyl acetate in the presence of 0.1 gram of platinum oxide. The hydrogenation was conducted at ambient pressure and temperature. After 5 hours the theoretical amount of hydrogen had been consumed and hydrogen absorption decreased markedly. The ethyl acetate solution was filtered to remove catalyst and evaporated on a water bath, leaving a slightly yellow oily residue of 6,7-diacetoxybenzofuran which quickly crystallized. The 6,7-diacetoxybenzofuran thus produced was dissolved in a small quantity of acetone and precipitated by dilution with water. The 8 grams of product thus obtained was distilled at 120° C. and 0.1 mm. pressure and yielded 7.2 grams of 6,7-diacetoxybenzofuran of M.P. 88–91° C. On recrystallization from a mixture of ethyl acetate and petroleum ether, the 6,7-diacetoxybenzofuran melted at 96–97° C.

*Example 2*

6,7-dihydroxybenzofuran (III) was prepared as follows: To a solution of 1.5 grams of lithium aluminum hydride in 100 ml. of anhydrous ether was added a solution of 4 grams of 6,7-diacetoxybenzofuran in 90 ml. of anhydrous ether. The addition was made through a dropping funnel slowly to avoid an explosive exothermic reaction, the reaction mixture being stirred and refluxed during the addition. Subsequent to the addition the entire mixture was refluxed for 3½ hours. After careful cooling with ice water 5 ml. of ethyl acetate was added, followed by 80 ml. of 2 N sulfuric acid. The organic layer was separated, washed with water and dried with anhydrous sodium sulfate. The organic solvents were evaporated at ambient temperature, leaving a colorless oily residue of 2.2 grams of 6,7-dihydroxybenzofuran which crystallized after 1½ days. The 6,7-dihydroxybenzofuran was dissolved in warm benzene at 40–50° C. and precipitated with petroleum ether. There was thus obtained 1.6 grams of 6,7-dihydroxybenzofuran of M.P. 70–74° C.

*Example 3*

6,7 - di - (1' - carbomethoxy - 1' - propen - 2' - yloxy) benzofuran (IV).—A solution of 2.7 grams of methyl β-chlorocrotonate and 1.5 grams of 6,7-dihydroxybenzofuran in 200 ml. of anhydrous acetone was added dropwise to a vessel containing 20 grams of anhydrous potassium carbonate under a nitrogen atmosphere. The mixture was agitated and refluxed for 10 hours under nitrogen. The hot solution was filtered to remove inorganic salts and the filtrate evaporated to remove acetone. The oily residue after brief treatment with petroleum ether formed brownish crystals, M.P. 121–124° C.; yield 2.1 grams (61.5%). After recrystallization from cyclohexane-petroleum ether and aqueous methanol, there were obtained crystals of 6,7-di-(1'-carbomethoxy-1'-propen-2'-yloxy) benzofuran of M.P. 124–126° C.

*Example 4*

6,7 - di - (1' - carboxy - 1' - propen - 2' - yloxy) benzofuran (V) was prepared by two different methods: one by hydrolysis of 6,7-di-(1'-carbomethoxy-1'-propen-2'-yloxy) benzofuran (described in part A) and one by reaction of 6,7-diacetoxybenzofuran with methyl β-chloropropionate followed by hydrolysis of the intermediate ester (described in part B).

(A) A mixture of 2.5 grams of 6,7-di-(1'-carbomethoxy-1'-propen-2'-yloxy)benzofuran, 50 ml. of 96% ethanol and 7 ml. 50% sodium hydroxide solution was occasionally stirred and left standing for 24 hours. Upon acidification with 5 N hydrochloric acid, 1.9 grams of 6,7-di-(1'-carboxy-1'-propen - 2' - yloxy)benzofuran (V) precipitated. The product was crystallized from aqueous methanol and melted at 224–227° C. (with decarboxylation).

(B) A solution of 11.7 grams of 6,7-diacetoxybenzofuran and 35 grams of methyl β-chlorocrotonate in 280 ml. of anhydrous acetone containing 36 grams of anhydrous methanol was added to 42 grams of anhydrous potassium carbonate in a nitrogen atmosphere. The mixture was agitated and refluxed for 20 hours. The inorganic salts were removed by filtration and the organic solvents were evaporated from the filtrate under vacuum, leaving a brown oily residue. This was dissolved in 150 ml. of ethanol and treated with 75 grams of 50% sodium hydroxide solution. The resulting mixture was allowed to stand for 24 hours with occasional stirring and was finally acidified with 2 N hydrochloric acid and diluted with water to twice its volume. A precipitate of 6,7-di-(1' - carboxy - 1' - propen - 2' - yloxy)benzofuran (V) was formed which, after drying, weighed 13 grams (82% yield) and melted at 213–216° C. (with decarboxylation).

*Example 5*

2 - methyl - 8 - (1'' - carboxy - 1'' - propen - 2'' - yloxy) furo[2',3',7,6]chromone (VI).—One gram of 6,7-di-(1'-carboxy-1'-propen-2'-yloxy)benzofuran (V) was dissolved in 15 ml. of acetyl chloride containing 16 drops of 70% aqueous perchloric acid (density 1.67). The resulting mixture was allowed to stand at room temperature for 5 days. Then the major parts of the acetyl chloride was evaporated under vacuum at 20° C. The residue was poured into ice water and the precipitate which formed was collected on a filter, washed with water, suspended in 30–40 ml. of boiling water and again collected on a filter. A yield of 0.8 gram of 2-methyl-8-(1''-carboxy-1''-propen-2''-yloxy)furo[2',3',7,6]chromone, M.P. 235–245° C. (with decarboxylation), was obtained. After recrystallization from n-butanol the product melted at 258–260° C. (with decarboxylation). The phenol reaction with 4-aminoantipyrine gave a deep violet color. The ultraviolet absorption spectrum in methanol showed $\gamma_{max.}$ 238 m$\mu$ (log=4.94); $\gamma_{min.}$ 222 m$\mu$ (log=4.78).

*Example 6*

2 - methyl-8-hydroxyfuro[2',3',7,6]chromone (VII).— 1.14 grams of 2-methyl-8-(1''-carboxy-1''-propen-2''-yloxy)furo[2',3',7,6]-chromone (VI) was finely ground and mixed with 18 grams of 48% hydrobromic acid. The resulting suspension was shaken for 24 hours and the oxonium salt which formed was removed and dissolved in saturated sodium bicarbonate solution, whereupon a greenish precipitate of 2-methyl-8-hydroxyfurol[2',3',7,6]chromone formed. The product weighed 0.77 gram (94% of theory); on melting point determination it began to decompose at 266° C. and to sublime at 280° C. and melted at 296–300° C. with decomposition. With 4-aminoantipyrine a blue color was formed which turned to brown on standing.

2-methyl-8-hydroxyfuro[2',3',7,6]chromone was methylated with diazomethane to form 2-methyl-8-methoxyfuro[2',3',7,6]chromone of M.P. 204–205.5° C.

*Example 7*

Khellin quinone (VIII).—To a solution of 1 gram of 2-methyl-8-hydroxyfuro[2',3',7,6]chromone (VII) in 75 ml. of dimethylformamide was added rapidly a solution of 3.1 grams of potassium nitrosodisulfonate and 1.2 grams of KH$_2$PO$_4$ in 230 ml. of water. The mixture was shaken and after about 10 minutes yellow needle-shaped crystals of khellin quinone began to precipitate. After 24 hours with occasional shaking the mixture was filtered and 0.8 gram (75% of theory) of khellin quinone was obtained; M.P. 196–202° C. (with decomposition).

*Example 8*

*5,8-bisnorkhellin* (IX).—A stream of sulfur dioxide was passed into a suspension of 0.57 gram of khellin quinone in 57 ml. of ethanol for ½ hour. The khellin quinone went into solution and then partially precipitated as 5,8-bisnorkhellin. After evaporation of the solvent in vacuum on a water bath there was obtained 0.52 gram (90.5% of theory) of 5,8-bisnorkhellin of M.P. 280–282° C.

*Example 9*

*Khellin* (X).—A solution of 0.51 gram of 5,8-bisnorkhellin and 1 ml. of dimethyl sulfate in 145 ml. of anhydrous acetone was mixed with 23 grams of anhydrous potassium carbonate under a nitrogen atmosphere and the suspension was agitated and refluxed for 28 hours. The hot mixture was filtered and the filtrate evaporated under vacuum. The resinous residue was boiled for 10 minutes with 150 ml. of water, during which time most of the residue dissolved. The hot solution was filtered and chilled. After 6 hours 0.4 gram (70% of theory) of needles of khellin precipitated. The melting point of the product was 150–152.5° C. and the mixed melting point with natural khellin was not changed.

What is claimed as new and is desired to be secured by Letters Patent of the United States is:

1. Method of producing a compound of the formula

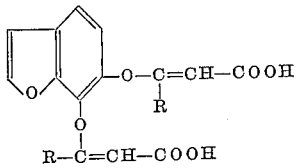

wherein R is selected from the group consisting of hydrogen and lower alkyl radicals, which comprises reacting a benzofuran compound of the formula

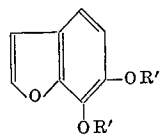

wherein R' is selected from the group consisting of hydrogen and lower alkanoyl radicals, with lower alkyl ester of β-halo-α,β-unsaturated lower alkenoic acid in the presence of alkali, and separating the ether-acid product thus formed.

2. Method of producing a compound of the formula

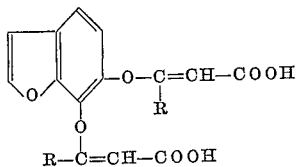

wherein R is a lower alkyl radical, which comprises reacting 6,7-dihydroxybenzofuran di-ester of lower alkanoic acid with lower alkyl ester of β-halo-α,β-unsaturated lower alkenoic acid in the presence of alkali, and separating the ether-acid product thus formed.

3. Method of producing 6,7-di-(1'-carboxy-1'-propen-2'-yloxy)benzofuran which comprises reacting 6,7-diacetoxybenzofuran with lower alkyl β-halocrotonate in the presence of alkali, and separating the ether-acid product so produced.

4. Method of claim 3 wherein the lower alkyl β-halocrotonate is methyl β-chlorocrotonate.

5. Method of claim 4 wherein the alkaline reagent is alkali metal carbonate.

6. Method of claim 5 wherein the alkaline reagent is potassium carbonate.

7. Method of producing a quinone compound of the formula

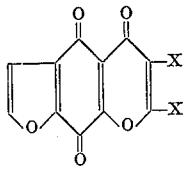

wherein X is a member of the group consisting of hydrogen and lower alkyl radicals, which comprises reacting a compound of the formula

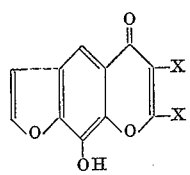

with an oxidizing agent selected from the group consisting of alkali metal nitrosodisulfonates, nitric acid and hexavalent chromium compounds, and isolating the quinone compound so formed.

8. Method of claim 7 wherein X is methyl.

9. Method of producing a quinone compound of the formula

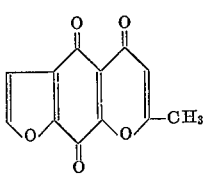

which comprises oxidizing a compound of the formula

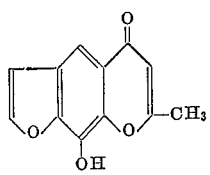

with alkali metal nitrosodisulfonate.

10. Method of claim 8 wherein the oxidizing agent is potassium nitrosodisulfonate.

11. A compound of the formula

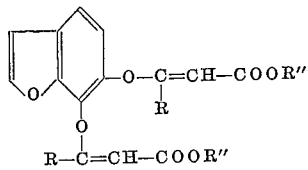

wherein R and R'' are members of the group consisting of hydrogen and lower alkyl radicals.

12. A compound as defined by claim 11 wherein R and R'' are methyl radicals.

13. A compound as defined by claim 12 wherein R is methyl and R'' is hydrogen.

14. Method of producing a 6,7-dihydroxybenzofuran compound which comprises reacting 6,7-dihydroxybenzofuran diester of lower alkanoic acid with alkali metal hydride of a metal of group VIIIA and isolating the 6,7-dihydroxybenzofuran compound thus formed.

15. Method of producing 6,7-dihydroxybenzofuran which comprises reacting 6,7-diacetoxybenzofuran with lithium aluminum hydride and isolating the 6,7-dihydroxybenzofuran thus formed.

16. Method of producing a 6,7-dihydroxybenzofuran diester of a lower alkanoic acid which comprises hydrogenating 3,6,7-trihydroxybenzofuran triester of lower alkanoic acid with platinum oxide catalyst and isolating the 6,7-dihydroxybenzofuran diester thus formed.

17. Method of claim 16 wherein the 3,6,7-trihydroxybenzofuran triester is 3,6,7-triacetoxybenzofuran.

References Cited in the file of this patent
UNITED STATES PATENTS
2,666,766    Badran _____ Jan. 19, 1954

OTHER REFERENCES

Huttrer et al.: Chemical Reviews, vol. 48, No. 3, pp. 560–561 (1951).